Patented Nov. 26, 1935

2,021,949

UNITED STATES PATENT OFFICE 2,021,949

PIGMENT DISPERSION

Harry E. Stone, Jeffersonville, Pa.

No Drawing. Application November 22, 1933,
Serial No. 699,137

5 Claims. (Cl. 106—37)

My invention relates to an improved method for the dispersion of a black pigment in a semi-colloidal state in which form it is extremely useful in the formulation of black lacquer enamels. Due to the extremely fine dispersion of the pigment it has no appreciable tendency to settle from the lacquers in which it is used and these lacquers exhibit a marked improvement in gloss and depth of film.

Since the inception of lacquer and its increasing popularity and utility as a protective coating the necessity for extremely fine or colloidal dispersion of pigments used has become more generally recognized. The desirability of such dispersion was evident in the pigmentation of paints and enamels but only approached necessity with the growth of the lacquer industry. With the high vehicle content of paints and enamels a high gloss product was not difficult to obtain since a relatively large amount of pigment might be incorporated without having a great flatting action. In nitrocellulose lacquers having a limited solid content necessitated by the relatively high viscosity characteristics of nitrocellulose solutions and the limits of resin content governed by durability requirements sufficient pigment for adequate covering could not be incorporated in a lacquer drying with a high gloss. The gloss of a lacquer having suitable covering power for economical use is therefore directly dependent upon the degree and uniformity of dispersion of the pigment it contains. The burh stone and pebble mill have been improved to give increased dispersion. The more expensive celluloid roll process has been used with some success. More elaborate grinding equipment, such, for example, as the three and five roll mills has been perfected to give pigment dispersions of greater fineness. Extreme difficulty, however, is encountered in the dispersion of the so-called hard pigments of which carbon black is the best example.

Of these grinding methods, the present invention relates to that of the celluloid or roll process in which a mixture of pigment, nitrocellulose and plasticizer or excess solvent is run to a substantially dry condition as most applicable to the uniform and colloidal dispersion of black pigments. The objects of the invention have been to produce a lacquer base incorporating a pigment base in very finely dispersed form by the use of the differential roll grinding process. The invention rests upon the discovery that a pigment may be dispersed in a mixture of nitrocellulose and plasticizer to a degree amounting to substantial colloidal dispersion provided a fourth ingredient consisting of a copper salt of an alkyl or aryl half ester of phthalic acid is incorporated in proper proportion in the mixture to be subjected to the roll dispersion process. The preferred agent for use in this connection is copper butyl phthalate. This agent is readily available on the American market and has been found to have a remarkable effect upon the dispersion of pigments subjected to the differential roll process. I wish it to be understood, however, that other equivalent agents falling within the class discussed above are within the scope of my invention.

As an example of the invention I may prepare a mixture containing:

10 lbs. ½ second nitrocellulose
4.3 lbs. alcohol (present with the nitrocellulose as a safeguard in transportation and handling)
1.5 lbs. carbon black
5 lbs. tricresyl phosphate
.25 lb. copper butyl phthalate Other grades or types of nitrocellulose may, however, be used and they may be wet with solvents or non-solvents other than alcohol. The carbon black may be any black pigment which is composed essentially of carbon. In place of tricresyl phosphate I may use dibutyl phthalate or other chemical plasticizer used in lacquer formulation.

The compound is mixed and run continuously between rolls of the celluloid type which are preferably differentially rotated. The nitrocellulose is quickly gelatinized in the tricresyl phosphate and the alcohol and the carbon black uniformly mixed therein. In the exposed sheet condition the alcohol continuously evaporates with a consequently hardening of the mixture. In this hardened condition the copper butyl phthalate enables the pigment to be intimately and completely wetted by the nitrocellulose and plasticizer vehicle. The mixture is removed from the rolls in continuous sheet form and appears as a brittle celluloid-like sheet at room temperature. The pigment base so prepared may be dissolved in the usual nitrocellulose solvents or mixtures or in a clear lacquer or in or with other lacquer ingredients to give black lacquer enamels.

The black lacquer enamel so produced gives a film having excellent gloss and jettness regardless of ratio of other solids necessitated by the general range of formulations. The pigment in the substantially colloidal state has little or no tendency to settle even after long periods of storage.

I am aware that Patents Nos. 1,864,151 and 1,864,152 issued to Simms, Bannister and Swallen describe the use of metallic salts of the alkyl and aryl esters of phthalic acid as an aid in the wetting of pigments in a mixture including either tricresyl phosphate or dibutyl phthalate. These patents suggest the use of such dispersing agents only in wet grinding processes, however, and base their results entirely on the flow characteristics of the finished paste. My method relates entirely to the use of the celluloid roll method of grinding which gives a hard brittle product. Furthermore, it is important to note that certain of the salts of the half esters suggested in those patents are inapplicable to the roll dispersion process, whereas the use of copper butyl phthalate has been found to possess remarkable and unpredictable advantages in the dispersion of pigments by such a process.

In the practice of the invention, wide variations in the relative proportons of ingredients have been found consistent with excellent results. Thus, the quantity of dispersing agent used in the practice of the invention may vary within wide limits, amounts of copper salts of alkyl half esters of phthalic acid varying between 3 and 15% with respect to the quantity of plasticizer used having been found to produce effective results.

I claim:

1. The method of producing a pigmented nitrocellulose plastic which comprises mixing a black carbon pigment, nitrocellulose, copper butyl phthalate and a plasticizer and thereafter subjecting the mixture so produced to a roll grinding process in which the composition is ground until a mass is produced which is hard and brittle at room temperature.

2. The method of producing a pigmented nitrocellulose plastic which comprises mixing a black carbon pigment, nitrocellulose, copper butyl phthalate and a plasticizer and thereafter subjecting the mixture so produced to a roll grinding process, the quantity of copper butyl phthalate used being between 3 and 15% of the quantity of plasticizer present in the mixture in which the composition is ground until a mass is produced which is hard and brittle at room temperature.

3. A hard rolled pigment dispersion base for incorporation with solvents and other ingredients in the production of lacquer comprising a finely dispersed hard and brittle solid mass consisting of a black carbon pigment, nitrocellulose, tricresyl phosphate and from 3% to 15% of copper butyl phthalate as based on the tricresyl phosphate.

4. A hard rolled pigment dispersion base for incorporation with solvents and other ingredients in the production of lacquer comprising a finely dispersed hard and brittle solid mass consisting of a black carbon pigment, nitrocellulose, dibutyl phthalate and from 3% to 15% of copper butyl phthalate as based on the dibutyl phthalate.

5. A hard rolled pigment dispersion base for incorporation with solvents and other ingredients in the production of lacquer comprising a finely dispersed hard and brittle solid mass consisting of a black carbon pigment, nitrocellulose, a plasticizer and copper butyl phthalate.

HARRY E. STONE.